Dec. 15, 1936.  F. MARASSO  2,064,437
LOADING DEVICE FOR PROOFERS
Filed March 25, 1936  3 Sheets-Sheet 1

Inventor:
Fred Marasso,
by Charles O. Shurvey
His Atty.

Dec. 15, 1936.　　　　F. MARASSO　　　　2,064,437
LOADING DEVICE FOR PROOFERS
Filed March 25, 1936　　　3 Sheets-Sheet 2

Inventor:
Fred Marasso,
by Charles J Shervey
his Atty.

Dec. 15, 1936.  F. MARASSO  2,064,437
LOADING DEVICE FOR PROOFERS
Filed March 25, 1936   3 Sheets-Sheet 3
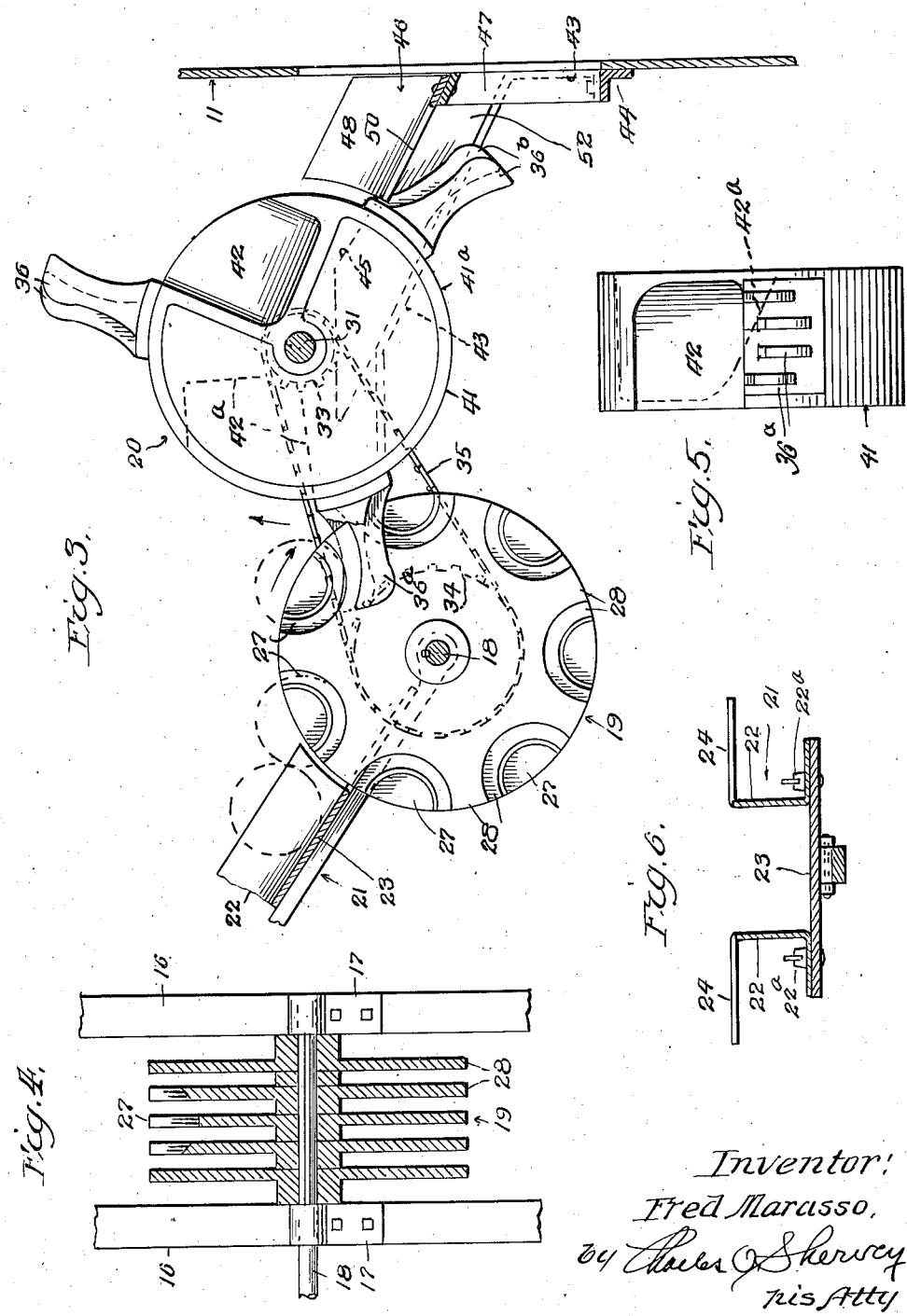
Inventor:
Fred Marasso,
By Charles J Shervey
his Atty.

Patented Dec. 15, 1936

2,064,437

UNITED STATES PATENT OFFICE 2,064,437

LOADING DEVICE FOR PROOFERS

Fred Marasso, Joliet, Ill., assignor to Union Machinery Company, Joliet, Ill., a corporation of Illinois Application March 25, 1936, Serial No. 70,732

8 Claims. (Cl. 198—31)

This invention relates to loading devices for proofers.

The principal object of this invention is to provide a novel loading device which is capable of being operated in connection with high speed bakers' machinery, such as high speed dividers in connection with rounders or rounding up machines, particularly those adapted for rounding up bread, buns and the like, which deliver the rounded up dough lumps in rapid succession, from 100 to 150 dough lumps per minute, and some difficulty has been encountered in handling dough lumps delivered in such rapid succession to the loading mechanism for the proofer.

The invention has reference more particularly to loading devices which load several dough lumps into each proofer tray. The dough lumps are delivered by the rounder, one at a time, in rapid succession and several of them are loaded upon a proofer tray while passing by the loading device.

One of the objects of this invention is to enable the element of the loading device that transfers the dough lumps to the proofer trays, to positively pick up only one dough lump at a time and also to properly pick it up so as to ensure the proper loading of the tray. In many instances, particularly with high speed bakers' machinery, two or more dough lumps are likely to collect in the chute which transfers them from the rounder to the loading device, and in that even the transfer element of the latter is likely to transfer two lumps at a time. Sometimes a dough lump is likely to become impaled on the fingers of the transfer element, and one of the objects of the present invention is to eliminate all such possibilities.

With these and other objects and advantages in view, this invention consists in the several novel features of construction, arrangement and combination of parts, hereinafter fully set forth and claimed.

The invention is clearly illustrated in the drawings accompanying this specification, in which:

Fig. 3 is a vertical, longitudinal section, taken on the line 3—3 of Fig. 2;

Fig. 4 is a detail, cross-section, taken on the line 4—4 of Fig. 1;

Fig. 5 is an end elevation of the drum member of the transfer element with certain of its fingers omitted; and Fig. 6 is a detail, cross-section of a chute, taken on the line 6—6 of Fig. 1.

Figure 1:
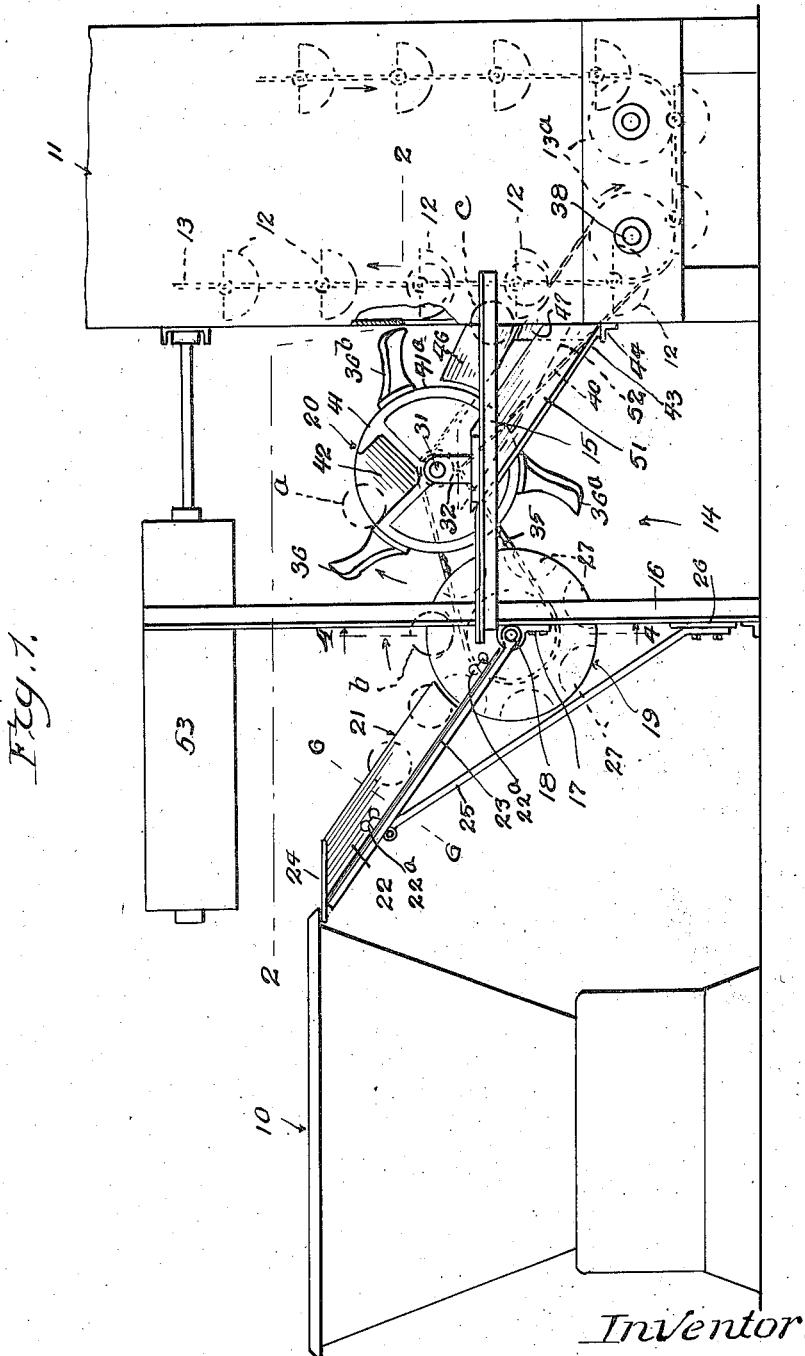
Fig. 1 is a side elevation of an installation comprising a rounder and the receiving end of a proofer, with the loading device interposed between the two.
Figure 2:
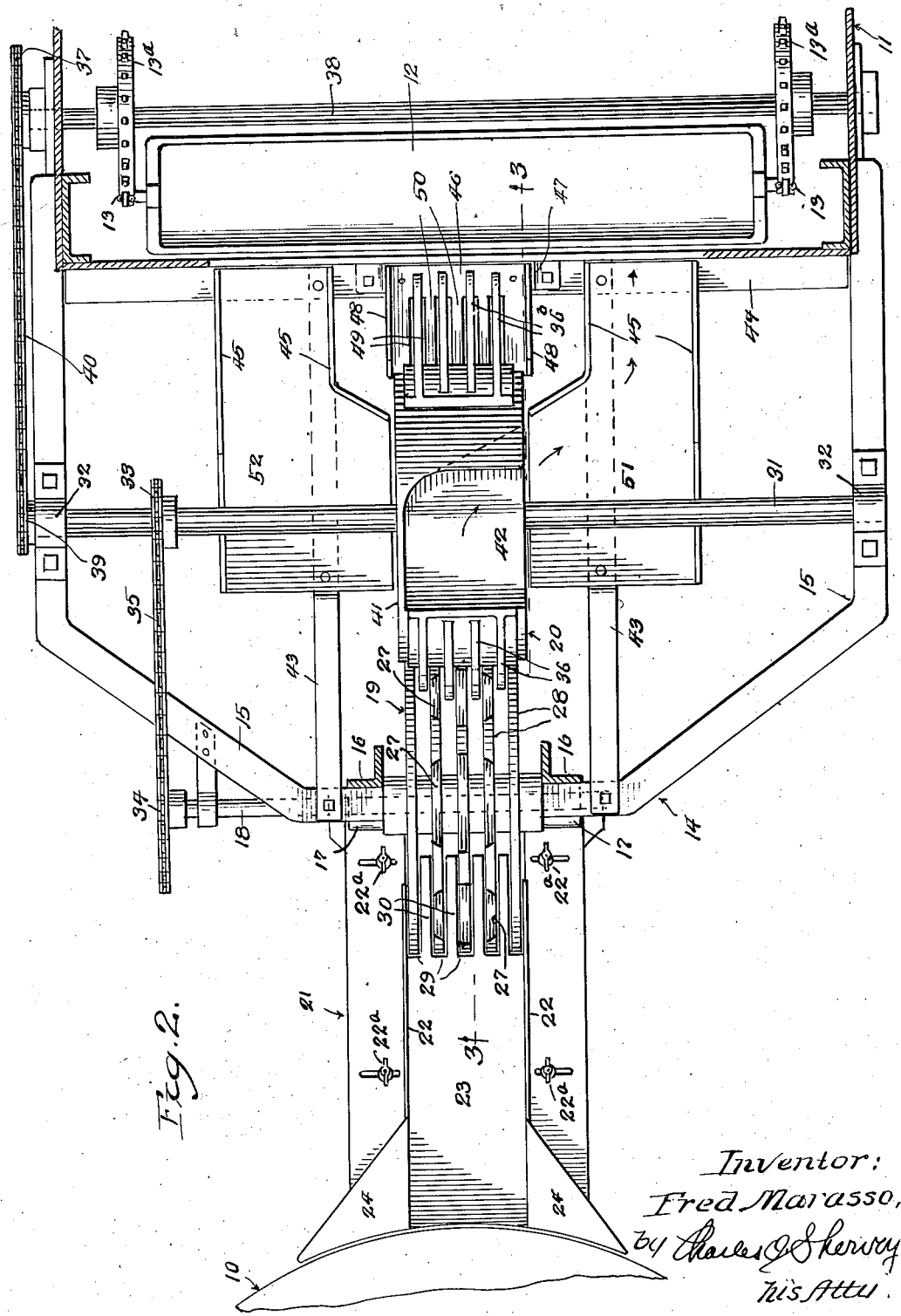
Fig. 2 is a view, partly in plan and partly in horizontal section, taken on the line 2—2 of Fig. 1.

Referring to said drawings, which are merely illustrative of one embodiment of the invention, the reference character 10 designates a rounder or rounding up machine of conventional form, and 11 designates the receiving end of a proofer, in which are contained traveling proofer trays 12 carried by chains 13, trained around sprocket wheels, two sets of which are shown in the receiving end of the proofer, at 13ª.

As is well understood, the chains with the associated proofer trays, travel through an elongated horizontal chamber of the proofer. The loading device, designated generally by 14, is interposed between the discharge end of the rounder and the receiving end of the proofer.

A supporting frame is provided for the loading device, which frame may comprise horizontal frame members 15, secured at one end of the frame work of the proofer and supported at its other end by upright frame members 16. Journaled in bearing brackets 17, mounted on the uprights 16, is a shaft 18 upon which is rigidly mounted a lump spacing drum 19 which receives the dough lumps from the rounder and carries them to a transfer element 20, which picks them up from the drum one at a time and delivers them, one at a time, to the proofer tray which is in position to receive them.

Between the rounder and the drum 19 is an inclined chute 21 upon which the rounder discharges the dough lumps, one at a time, in rapid succession, the dough lumps rolling down said chute to the drum 19. Desirably the chute is made laterally adjustable to accommodate large and small dough lumps. As shown, said chute comprises side walls consisting of angle-shaped plates 22 fastened to a bottom plate 23 by wing nuts and bolts 22ª. The horizontal flanges of the side walls are provided with transversely extending slots for the bolts to permit lateral adjustment of the side walls. The side walls are provided with laterally projecting shelves 24, adjacent the discharge end of the rounder, so as to catch any dough lumps that happen to be misdirected by the rounder in discharging them. The chute is pivotally mounted on the shaft 18 and a brace bar 25 is provided for supporting the free end of the chute. The lower end of the brace bar 25 is adjustably mounted on a cross member 26, secured to the uprights 16 and provides means for raising and lowering the free end of the chute.

On the periphery of the drum 19 are a number of pockets 27 spaced equi-distantly around the circumferential face of the drum. These pockets are intended to receive dough lumps from the chute 21 and carry them to the transfer element 20. In the embodiment of the invention illustrated, the drum is formed of a series of spaced discs 28, spaced apart by hubs mounted on the shaft 18, and the pockets 27 are formed by notching the edges of the intermediate discs, as clearly seen in Fig. 3 and Fig. 4. The bottom member 23 of the chute is slotted lengthwise thereof, as at 29, to provide fingers 30, which extend between the discs 28 of the drum, the notches providing spaces for the discs to travel in.

The transfer element 20 desirably comprises a drum-like body 41 and groups of fingers 36, 36ᵃ, 36ᵇ, which project radially from the cylindrical face of the body. Extending inward and laterally in opposite directions from the cylindrical face of the body 41 adjacent the groups of fingers 36, 36ᵃ, are inclined passageways 42, 42ᵃ that open outward through the side faces of the body, one passageway opening out through one side face and the other opening out through the other side face of the body. Dough lumps delivered to the transfer element and picked up by the sets of fingers 36, 36ᵃ, adjacent said passageways, are discharged from the transfer element at the two opposite sides thereof. The face of the drum-like body adjacent the third set of fingers 36ᵇ, and indicated by reference character 41ᵃ, is not provided with any opening but is left solid so that lumps of dough picked up by said third set of fingers 36ᵇ are carried around on the cylindrical face of the body and discharged therefrom.

From the above it is apparent that during each complete rotation of the transfer element, two dough lumps are discharged therefrom at its sides and one dough lump is discharged therefrom midway between the sides of the body. This particular arrangement of transfer element is not material to the invention, broadly considered, as it may be arranged to handle dough lumps for a five pocket proofer tray. Such a transfer element is more fully shown and described in Patent Number 1,890,740, issued December 13, 1932, for Loading apparatus for proofers. It is to be understood, therefore, that a transfer element capable of handling a greater or lesser number of dough lumps may be used in place of the one shown.

The transfer element 20 is rigidly mounted upon a shaft 31, journaled in bearing brackets 32, supported upon the horizontal frame members 15. Gearing is provided between the drum 19 and transfer element 20, whereby they rotate in timed relation to each other, the gearing shown comprising sprocket wheels 33, 34, on the shafts 31, 18, respectively, and a sprocket chain 35 trained around the sprocket wheels. The shaft 31 for the transfer element may be driven from a shaft 38 of the proofer and is driven so as to rotate in timed relation to said shaft 38, whereby the transfer element may deliver the dough lumps into each proofer tray while in position to receive them. The speed of the drum 19 is relatively slow as compared with the speed of the transfer element 20, and, as shown, the drum is provided with seven pockets, whereas the transfer element is provided with three sets of fingers which pick up the dough lumps from the pockets in the drum and transfer them to the proofer trays. The gearing between the proofer and transfer element may comprise a sprocket wheel 37, mounted on the shaft 38 of the proofer, sprocket wheel 39 on the shaft 31 of the transfer element and a sprocket chain 40 trained around said sprocket wheels.

The gear ratio between the shafts 38, 31 is such that the transfer element makes one complete revolution while a tray moves through a distance equal to the distance between the trays, center to center. This enables the transfer element to load the required number of dough lumps into each tray.

At both sides of the transfer element are inclined chutes 51, 52, which are supported by bars 43, carried by the horizontal frame members 15 and a horizontal bar 44 located on the proofer. The chutes have side walls 45 that guide the dough lumps toward the lower or discharge ends of the chutes. The upper ends of the chutes are disposed below the axis of the transfer element, in position to receive the dough lumps discharged from the sides thereof, and the lower end of the chute 51 is located at a level that enables it to deliver a dough lump to a tray as it commences its ascent past the chute. The lower end of the chute 52 is located at a higher level than that of the chute 51 so as to deliver a dough lump to the same tray which, by the time a dough lump reaches the bottom of the chute 52, has moved upward a short distance from the position in which it received the first lump.

Between the chutes 51, 52 is a third inclined chute 46 which extends from a point adjacent the cylindrical face of the body of the transfer element to the proofer, and is supported by a bracket 47 that is secured to and extends upward from the bar 44. The chute 46 has side walls 48 for guiding the lumps of dough toward the tray and it is also formed with notches 49 to permit the fingers of the transfer element to pass by the chute. Between the notches 49, are fingers 50 that enter spaces between the fingers of the transfer element as they pass by the chute.

A duster 53 is provided above the loading mechanism for supplying dusting flour thereto. This eliminates the possibility of the dough lumps from sticking to the various parts of the loader. The duster is of conventional form operated from some element of the proofer.

In the operation of the loading device, the dough lumps are discharged from the rounder upon the chute 21 in rapid succession and roll down the chute to the spacing drum 19 where they are stopped and held back by the cylindrical face of the drum until a pocket thereof passes the lower end of the chute, whereupon one of the dough lumps drops into the pocket. The spacing drum rotates in the direction of the adjacent arrow, carrying the dough lumps toward the transfer element, which rotates in the direction of the adjacent arrow, and when a pocket and a group of fingers reach the position seen in Fig. 3, the fingers pick up the dough lump. When the group of fingers 36 have carried the dough lumps to the position seen in Fig. 1, it rolls down the passageway 42 in the transfer element, from which it is discharged upon the chute 51 and rolls down into the tray which at that time occupies a position immediately below the lower end of the chute. Fig. 1 shows the parts in the position occupied when the first dough lump (a) is being discharged into a tray. Prior to this time the group of fingers 36ᵇ have picked up and carried a dough lump (c) on the solid part of the drum-like body and have discharged the dough lump (c) upon the middle chute 46 and it is about to drop into the tray next above the one into which the fingers 36 are about to discharge the first lump (a) into the tray below. The fingers 36ᵃ follow the fingers 36 and pick up a dough lump (b) from the pocket next adjacent the one from which the fingers 36 receive a dough lump (a) and when said fingers 36ª arrive at the place previously occupied by the fingers 36, the dough lump (b) rolls down the passageway 42ª at the other side of the transfer element, is discharged upon the chute 52 and rolls down the same, into the same tray which received the first dough lump (a) from the fingers 36. As the tray moves upward, the third group of fingers 36ᵇ again pick up a dough lump from the spacing drum, carry it up past the position in which the dough lumps leave the other fingers 36, 36ᵇ and finally discharge it into the tray which was previously loaded with the dough lumps (a) (b) that were discharged from the sides of the transfer element.

From the above it is apparent that only one dough lump can enter a pocket of the spacing drum at one time and that one dough lump only is presented to the group of fingers that pass the pocket containing the dough lump, and inasmuch as the spacing drum moves slowly as compared with the speed of the transfer element, there is no likelihood for the dough lumps to become impaled on the fingers.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new and desire to secure by Letters Patent:

1. In a loading device for proofers, a rotatory spaced drum having spaced annular grooves extending inward from its periphery, the intermediate parts of the drum between the grooves being notched inwardly from the periphery at equi-distant spaces to provide pockets for conveying dough lumps, in combination with a rotatory transfer element having fingers arranged to pass through said grooves in the drum and pick up dough lumps contained in the pockets.

2. In a loading device for proofers, a rotatory spacing drum comprising spaced discs, the intermediate ones of which are formed with laterally registering notches in their peripheries to provide pockets spaced equi-distantly about the circumference of the drum, in combination with a rotary transfer element having groups of fingers arranged to pass through the spaces between the discs and pick up dough lumps contained in the pockets.

3. In a loading device for proofers, a low speed rotatory spacing drum comprising spaced discs having equi-distantly spaced notches providing pockets in the periphery of the drum, a high speed rotatory transfer element having a drum-like body and equi-distantly spaced groups of fingers on the periphery of the body, said fingers passing through the spaces between the discs and acting to pick up dough lumps in said pockets and transfer them to discharge places, and gearing between said spacing drum and transfer element for rotating them in timed relation to each other.

4. A loading device for proofers, comprising in combination a rotatory spacing element, having pockets to receive dough lumps, a rotatory transfer element having groups of fingers adapted to receive dough lumps from the pockets of the spacing element, said transfer element having also laterally and oppositely directed passageways thereon, through which the dough lumps are discharged laterally from the transfer element, and laterally spaced chutes for conveying the dough lumps from the transfer element.

5. A loading device for proofers, comprising in combination a spacing drum for receiving dough lumps and conveying them from a receiving point to a discharge point, a transfer element having equi-distantly spaced fingers arranged to pick up dough lumps from said spacing drum at its discharge point, and means in said transfer element for discharging dough lumps laterally therefrom, gearing for rotating said spacing drum and transfer element in timed relation to each other, and means for conveying the dough lumps discharged from the transfer element to a proofer tray.

6. A loading device for proofers, comprising in combination a spacing drum for receiving dough lumps and carrying them from a receiving point to a discharge point, and a rotatable transfer element having a drum-like body and groups of fingers spaced equi-distantly around the circumference of the body, there being oppositely directed laterally extending passageways in said body leading from some of the groups of fingers, and a plane surface at one group of fingers, said fingers being arranged to pick up dough lumps from the spacing drum at its discharge point, the fingers and drum co-operating to discharge the dough lumps at laterally spaced places.

7. A loading device for proofers, comprising in combination a spacing drum for receiving dough lumps and carrying them from a receiving point to a discharge point, a rotatable transfer element having a drum-like body and groups of fingers spaced equi-distantly around the circumference of the body, there being oppositely directed laterally extending passageways in said body leading from some of the groups of fingers, and a plane surface at one group of fingers, said fingers being arranged to pick up dough lumps from the spacing drum at its discharge point, the fingers and drum co-operating to discharge the dough lumps at laterally spaced places, and laterally disposed chutes adapted to receive the dough lumps from the transfer element and convey them to proofer trays.

8. A loading device for proofers, comprising in combination a rotatory spacing drum composed of spaced discs, the intermediate ones of which have registering notches in their peripheries, equi-distantly spaced around the circumference of the drum, to provide pockets, and a rotatory transfer element having a drum-like body and groups of fingers spaced equi-distantly around the circumference of the body and adapted to pass between the discs of the spacing drum and pick up dough lumps from the pockets, one group of fingers being adapted to convey dough lumps on the face of the body and discharge the dough lumps from the face of the body and there being oppositely directed, laterally extending, oppositely disposed passageways in the body leading from the other group of fingers.

FRED MARASSO.